(12) United States Patent
Agin et al.

(10) Patent No.: US 7,123,881 B2
(45) Date of Patent: Oct. 17, 2006

(54) METHOD FOR IMPROVING PERFORMANCES OF A MOBILE RADIOCOMMUNICATION SYSTEM USING A POWER CONTROL ALGORITHM

(75) Inventors: Pascal Agin, Sucy en Brie (FR); Sébastien Boch, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/287,264

(22) Filed: Apr. 7, 1999

(65) Prior Publication Data

US 2002/0151322 A1 Oct. 17, 2002

(51) Int. Cl.
*H04B 7/00* (2006.01)

(52) U.S. Cl. ........................ 455/69; 455/522; 455/574; 455/565

(58) Field of Classification Search ................ 455/69, 455/522, 574, 565
See application file for complete search history.

(56) References Cited

U.S. PATENT DOCUMENTS

| 5,305,468 | A | * | 4/1994 | Bruckert et al. | 455/69 |
| 5,590,409 | A | * | 12/1996 | Sawahashi et al. | 455/69 |
| 5,689,815 | A | * | 11/1997 | Yamazaki et al. | 455/69 |
| 5,771,451 | A | * | 6/1998 | Takai et al. | 455/442 |
| 5,771,461 | A | * | 6/1998 | Love et al. | 455/522 |
| 5,842,114 | A | * | 11/1998 | Ozluturk | 455/69 |
| 5,982,760 | A | * | 11/1999 | Chen | 370/335 |
| 5,987,326 | A | * | 11/1999 | Tiedemann et al. | 455/442 |
| 6,137,840 | A | * | 10/2000 | Tiedemann et al. | 375/297 |
| 6,185,431 | B1 | * | 2/2001 | Li et al. | 455/522 |
| 6,185,432 | B1 | * | 2/2001 | Vembu | 455/522 |
| 6,272,355 | B1 | * | 8/2001 | Lokio | 455/522 |
| 6,317,587 | B1 | * | 11/2001 | Tiedemann et al. | 455/69 |
| 6,377,813 | B1 | * | 4/2002 | Kansakoski et al. | 455/522 |
| 6,519,236 | B1 | * | 2/2003 | Haartsen et al. | 370/332 |
| 6,587,696 | B1 | * | 7/2003 | Ma et al. | 455/522 |
| 6,708,041 | B1 | * | 3/2004 | Butovitsch et al. | 455/522 |
| 6,744,754 | B1 | * | 6/2004 | Lee | 370/342 |

FOREIGN PATENT DOCUMENTS

GB   2 314 486 A   12/1997
WO   WO 98/51026   11/1998

* cited by examiner

*Primary Examiner*—George Eng
*Assistant Examiner*—Sharad Rampuria
(74) *Attorney, Agent, or Firm*—Sughrue Mion, PLLC (57) ABSTRACT

The present invention relates to a method and system for improving the performance of a mobile radiocommunication system, through the use of a power control algorithm. In this invention, the performance of a mobile radiocommunication system is improved by regularly estimating if a certain criterion is met or satisfied, to determine if a power control algorithm should be deactivated or not. The estimation of whether or not the set criterion is met is based on the estimation of a deviation value, which is representative of a deviation between an estimated transmission quality and a target or desired transmission quality. Thus, the present invention aids in avoiding situations in which the power control algorithm would normally be wrongly activated and, therefore, improves the overall performance of the mobile radiocommunication system.

71 Claims, 3 Drawing Sheets

METHOD FOR IMPROVING PERFORMANCES OF A MOBILE RADIOCOMMUNICATION SYSTEM USING A POWER CONTROL ALGORITHM

BACKGROUND OF THE INVENTION

The present invention is in a general way concerned with mobile radiocommunication systems.

The present invention is more particularly concerned with power control techniques used in such systems to improve performances (in terms of quality of service, of capacity, . . . etc.) despite the movements of users, i.e. despite continuous changes in their respective locations with respect to fixed infrastructures in such systems.

The present invention is in particular applicable to mobile radiocommunication systems of CDMA ("Code Division Multiple Access") type. CDMA is a multiple access technique which makes it possible for several users to be simultaneously active on a same frequency, using different spreading codes.

As is known, CDMA systems use two types of power control techniques, a so-called open-loop power control technique, and a so-called closed loop power control technique (also called hereinafter CLPC). These power control techniques may be recalled for example for the uplink transmission direction, i.e. from MS ("Mobile Station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as constant as possible.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a command to the MS for the MS to increase its transmit power. Otherwise, the BTS sends a command to the MS for the MS to decrease its transmit power. The target SIR is chosen by the BTS as a function of the required quality of service.

Such a principle however requires that the environment is not changing too fast, in particular that MSs speed is not too high.

WO 98/51026 teaches to adapt the power control step size of the CLPC algorithm, in particular as a function of MSs mobility requirements (the BTS in particular assigning a larger power control step size for MSs having higher mobility requirements).

This however does not solve the problem that in fast changing environments, such as when MSs speed is high, the CLPC algorithm cannot track the SIR variations, which results in degraded performances. Indeed in this case the speed of SIR variations is much higher than the repetition period of the algorithm, which may result in sending to a MS at a given instant $t_i$, a power control command obtained from environment requirements at instant $t_{i-1}$, and which no longer corresponds to environment requirements at instant $t_i$. This problem could be solved by reducing the repetition period of the algorithm, but this would result in a signalling increase between BTS and MS, and therefore in a non efficient use of available radio resources.

Therefore there is a general need to adapt such power control techniques, in particular to the case of fast changing environments, avoiding such drawbacks. The present invention meets such a purpose.

SUMMARY OF THE INVENTION

The present invention is based on the idea that in certain cases it would in fact be more efficient not to activate the power control algorithm at all, than to activate it (since it might be wrongly activated); this enables to improve the performances in a significant way.

An object of the present invention is a method for improving performances of a mobile radiocommunication system using a power control algorithm, said method essentially comprising:

regularly estimating if a criterion is met as to whether said power control algorithm should better be de-activated, de-activating said power control algorithm if said criterion is met.

According to another object of the invention, said de-activation includes performing said algorithm with a relatively higher repetition period.

According to another object of the invention, said de-activation includes performing another algorithm instead.

According to another object of the invention, said algorithm and said other algorithm are chosen in a group comprising closed-loop power control algorithms and open-loop power control algorithms.

According to another object of the invention, said method comprises:

regularly estimating if a criterion is met as to whether said power control algorithm should better be de-activated, when activated, or activated, when de-activated, de-activating, or activating, said power control algorithm if the corresponding criterion is met.

According to another object of the invention, provision may be made in said method, not to de-activate, or activate, said algorithm too frequently.

According to another object of the invention, said estimation as to whether said criterion is met is based on an estimation of a deviation value, representative of a deviation between an estimated transmission quality and a target transmission quality.

According to another object of the invention, said estimation as to whether said criterion is met includes:

an estimation of a first deviation value, which would have been obtained if said power control algorithm had always been activated, during a given time-interval on which said deviation value is estimated, an estimation of a second deviation value, which would have been obtained if said power control algorithm had never been activated, during said given time-interval on which said deviation value is estimated, a choice between activation and de-activation of said algorithm depending on which of said first and second deviation values is the lowest.

According to another object of the invention, said estimated transmission quality is represented by an estimated signal-to-interference ratio.

According to another object of the invention, said estimated transmission quality is represented by a received signal power.

According to another object of the invention, said estimated deviation value is represented by the variance of said estimated transmission quality.

According to another object of the invention, said method is performed in the uplink transmission direction of said mobile radiocommunication system.

According to another object of the invention, said method is performed in the downlink transmission direction of said mobile radiocommunication system.

According to another object of the invention, said mobile radiocommunication system is of CDMA type.

Another object of the present invention is a mobile radiocommunication network entity (such as in particular BTS) for performing such a method.

Another object of the present invention is a mobile station (MS) for performing such a method.

According to another object of the invention, a mobile radiocommunication network entity comprises, for performing said method in said uplink transmission direction:
means for performing such a method,
means for sending corresponding power control commands to a mobile station.

According to another object of the invention, a mobile station comprises, for performing said method in said uplink transmission direction:
means for receiving power control commands from a mobile radiocommunication network entity, according to such a method.

According to another object of the invention, a mobile station comprises, for performing said method in said downlink transmission direction:
means for performing such a method,
means for sending corresponding power control commands to a mobile radiocommunication network entity.

According to another object of the invention, a mobile radiocommunication network entity, comprises, for performing said method in said downlink transmission direction:
means for receiving power control commands from a mobile station, according to such a method.

BRIEF DESCRIPTION OF THE DRAWING

These and other objects of the present invention will become more apparent from the following description taken in conjunction with the accompanying drawings.

DETAILED DESCRIPTION OF THE INVENTION

Figure 1:
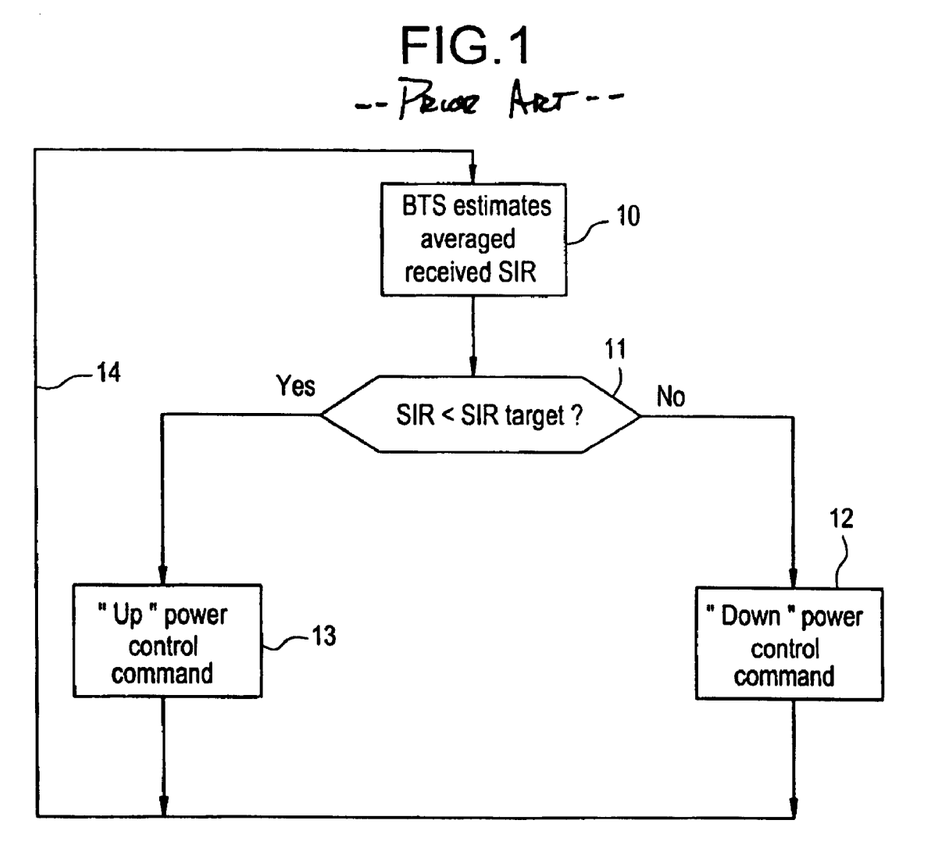
FIG. 1 is a diagram intended to illustrate a CLPC algorithm, according to prior art.

As recalled in FIG. 1, a current CLPC algorithm comprises the following steps, for each time $t_i$:

At step 10, the BTS estimates the average received SIR during a period T,

At step 11, the BTS compares this SIR to a target SIR, $SIR_{target}$,

If $SIR > SIR_{target}$, at step 12 the BTS sends a "down" power control command to the MS, for the MS to decrease its power by $\delta$ dB, where $\delta$ is a parameter of the algorithm, If $SIR < SIR_{target}$, at step 13 the BTS sends an "up" power control command to the MS, for the MS to increase its power by $\delta$ dB.

This is periodically repeated, with a repetition period T, as illustrated by loop 14.

As an example, a CLPC algorithm modified so as to include a method according to the invention will be described in the following. It should however be noted that the present invention may be used with other types of power control algorithms than the CLPC one. Besides, this description will be made as an example for the uplink transmission direction, but it should be noted that it may also be used for the downlink transmission direction.

Let $t_i = iT$ be the time when the i-th power control command, $\epsilon_i = \pm 1$ (+1="up", −1="down") is applied at the MS.

At time $t_i$ the MS changes its power by $\epsilon_i \delta$ dB, except if power control is de-activated at this time. In this latter case, the MS transmit power does not change.

Thus, the transmit power of the MS at time $t_i$ may be expressed as:

$$C_i = C_0 + \delta \sum_{k+1}^{I} \alpha_k \epsilon_k$$

where $C_0$ is the initial transmit power of the MS at time $t_0$, and $\alpha_k = 1$ if the power control was active at time $t_k$, and $\alpha_k = 0$ otherwise.

Figure 2:
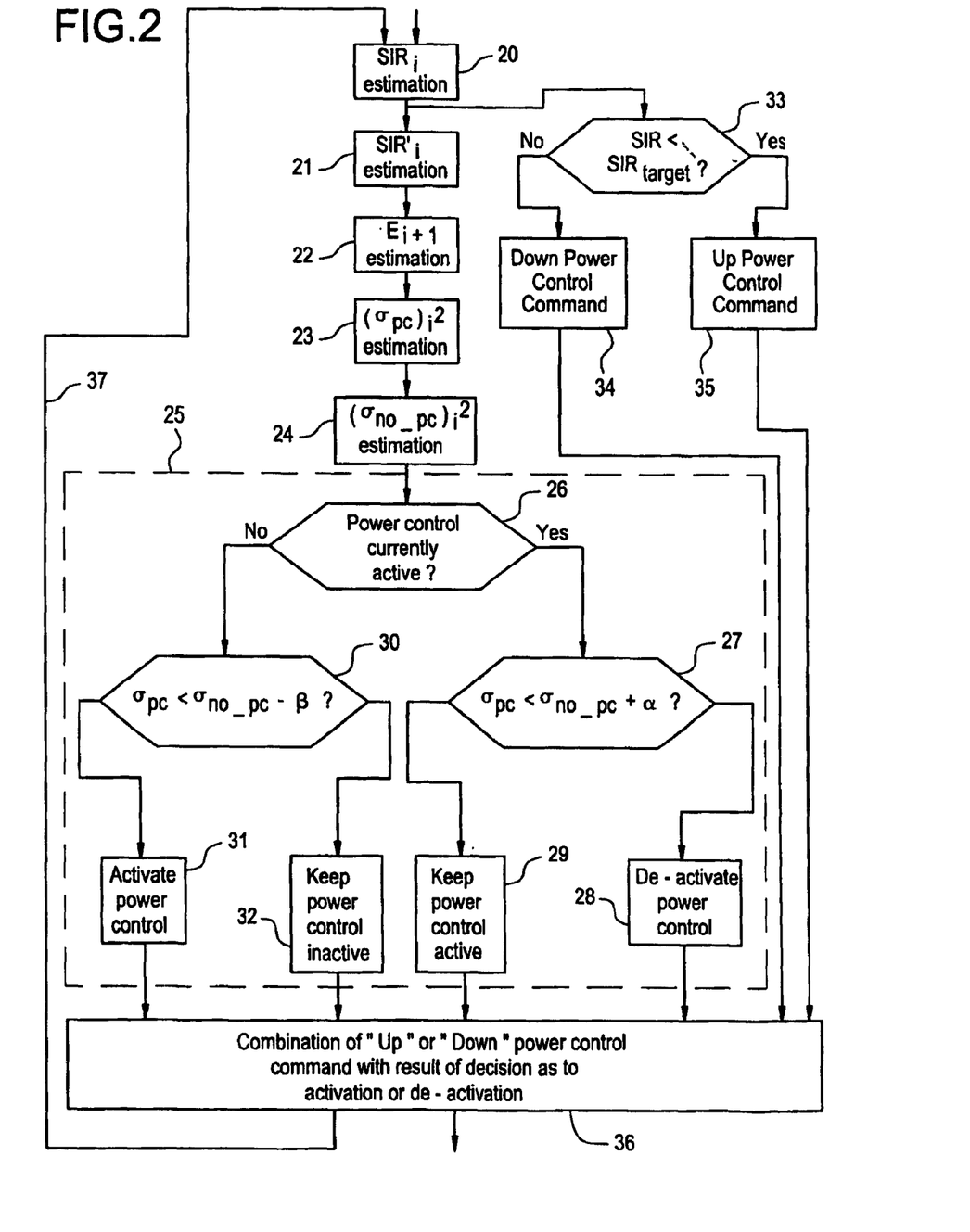
FIG. 2 is a diagram intended to illustrate a CLPC algorithm, modified so as to include a method according to the invention.

As illustrated in FIG. 2, a CLPC algorithm modified so as to include a method according to the invention comprises the following steps, for each time $t_i$:

At step 20, the BTS estimates the average received $SIR_i$. This SIR is estimated and averaged on a period T just after the signal transmitted by the MS at time $t_i$ has been received, At step 21, the BTS estimates the SIR, noted $SIR_i'$, that would have been observed if the power control had always been active, on the time-interval beginning at $t_{k=1}$ and ending at $t_{k=i}$, which has been considered for determining the transmit power of the MS at time $t_i$. This SIR may be computed as $$SIR_i' = SIR_i + \delta \sum_{k=1}^{I} (\epsilon_k' - \alpha_k \epsilon_k),$$

where $\epsilon_i'$ is the power control command that would have been sent to the MS at time $t_i$ if the CLPC algorithm had always been active on the considered time-interval, At step 22, the BTS estimates $\epsilon_{i+1}'$ (in view of computing $SIR_{i+1}$ at $t_{i+1}$):
if $SIR_i' < SIR_{target}$, $\epsilon_{i+1}' = 1$
if $SIR_i' > SIR_{target}$, $\alpha_{i+1}' = -1$ At step 23, the BTS estimates the variance $(\sigma_{PC})_i^2$ of the SIR that would have been obtained if power control had always been active on the considered time-interval. This variance may be computed as:

$$(\sigma_{PC})_i^2 = (1-c)(\sigma_{PC})_{i-1}^2 + c(SIR_i' - SIR_{target})^2$$

where c is a real parameter between 0 and 1 (usually close to 0).

At step 24, the BTS estimates the variance $(\sigma_{NO\text{-}PC})_i^2$ of the SIR that would have been obtained if power control had never been active on the considered time-interval. This variance may be computed as:

$$(\sigma_{NO\_PC})_i^2 = (1-c)(\sigma_{NO\_PC})_{i-1}^2 + c\left(SIR_i - \delta\sum_{i=1}^{1}\alpha_1\varepsilon_1 - SIR_{target}\right)^2$$

At step 25, the BTS decides if the power control may be activated or de-activated:

If the power control is currently active (as checked at step 26):
  If $\sigma_{PC} > \sigma_{NO\_PC} + \alpha$ (as checked at step 27) a decision is made (at step 28) to de-activate power control,
  Otherwise, a decision is made (at step 29) to keep power control active,
If the power control is currently inactive (as checked at step 26):
  If $\sigma_{PC} < \sigma_{NO\_PC} - \beta$ (as checked at step 30) a decision is made (at step 31) to activate power control,
  Otherwise, a decision is made (at step 32) to keep power control inactive $\alpha$ and $\beta$ are two positive parameters of this algorithm. In practice, they are close to 0 but usually different from 0 in order to avoid activating and de-activating the CLPC algorithm too frequently.

At step 33, the BTS compares $SIR_i$ to $SIR_{target}$:
  If $SIR_i > SIR_{target}$, the BTS provides at step 34 a "down" power control command for the MS (this command may or not be sent to the MS, as indicated hereinafter)
  If $SIR_i < SIR_{target}$, the BTS provides at step 35 an "up" power control command for the MS (this command may or not be sent to the MS, as indicated hereinafter).

Such an "up" or "down" power control command (provided at step 34 or 35) is combined at step 36 with the result of the decision as to activation or de-activation of the algorithm (provided at step 28, 29, 31, or 32), so as to generate a resulting power control command to be sent to the MS. An "up" or "down" power control command may be sent to the MS, if the power control is active, or activated; if the power control is inactive or de-activated, the BTS may either send such an "up" or "down" power control command to the MS, together with an indication that it has not to be taken into account, or not send any power control command at all to the MS (since it does not need it).

Besides, the above disclosed algorithm is periodically repeated, as illustrated by loop 37.

Thus, the above disclosed algorithm comprises the steps of:
  regularly estimating if a criterion is met as to whether said power control algorithm should better be de-activated, when activated, or activated, when de-activated (steps 20–24, 26, 27, 30)
  activating, or de-activating, said power control algorithm if said criterion is met (steps 28, 29, 31, 32).

In the example disclosed, said estimation as to whether said criterion is met includes:
  an estimation (step 23) of a first deviation value $(\sigma_{PC})_i^2$ which have been obtained if said power control algorithm had always been activated, during a given time-interval (beginning at $t_{k-1}$ and ending at $t_{k-1}$) on which said deviation value is estimated,
  an estimation (step 24) of a second deviation value $(\sigma_{NO\_PC})_i^2$ which would have been obtained if said power control algorithm had never been activated, during said given time-interval on which said deviation value is estimated,
  a choice (step 25) between activation and de-activation of said algorithm depending on which of said first and second deviation values is the lowest.

It is to be noted that said second deviation value $(\sigma_{NO\text{-}PC})_i^2$ could be replaced by a constant, which might be environment-dependant.

Besides, when the CLPC algorithm is de-activated, another algorithm that shows some better performances (in particular at high MSs speed) could be used instead, such as an in particular an open loop power control. Another possibility would be to let the CLPC algorithm be active but with a larger repetition period T. It is to be understood that the notion of "de-activation" used in this application includes such various possibilities.

Besides, other examples of performing said estimation as to whether said criterion is met could be possible. For instance, the variance $\sigma_i^2$ of the estimated signal-to-interference ratio $SIR_i$ could be compared to a given threshold (which might be environment-dependent), and depending on the result of this comparison it could be decided whether or not the algorithm should be de-activated.

Besides, in the example disclosed, said estimated transmission quality is represented by an estimated signal-to-interference ratio. Other examples could be possible; in particular said estimated transmission quality could be represented by a received signal power.

Besides, in the example disclosed, said estimated deviation value is represented by the variance of the estimated transmission quality; any estimator other than the variance could also be used.

The example disclosed is particularly advantageous in that it allows a recursive implementation of steps 20–25 of the algorithm, as appears from the above description of this algorithm, but other examples could also be possible.

Besides, a number of other variants could be envisaged from the above description of the algorithm.

As an example, said considered time-interval may not be referred to the time origin $t_0$, but to the current time $t_i$ minus some interval, e.g. $t_i$ to $t_{i-N}$, where N is a parameter of this algorithm.

In the latter case, the transmit power of the MS at time $t_i$ would be expressed $$\text{as: } C_i = C_{i-N} + \delta\sum_{k=0}^{N-1}\alpha_{i-k}\varepsilon_{i-k},$$

and the SIR that would have been observed if the power control had always been active on the considered interval as:

$$SIR_i' = SIR_i + \delta\sum_{k=0}^{N-1}(\varepsilon_{i-k}' - \alpha_{i-k}\varepsilon_{i-k}).$$

As another example, in the above disclosed algorithm, when receiving a power control command $\epsilon_i = \pm 1$, the MS computes its new power as $C_{i+1} = C_i + \epsilon_i \delta$ when power control is active.

The proposed algorithm can be generalized to any function $C_{i+1}=f_i(C_i\epsilon_i)$ where $f_i$ are some functions that can also depend from any previous power $C_i$ and power control command $\epsilon_i$, as well as any other parameter.

For instance, one might have a different power step for the "up" and "down" power control command, so that:

$C_{i+1}=C_i+\delta_{up}$ if the power is increased,
$C_{i+1}=C_i-\delta_{down}$ if the power is decreased.

In a general way, if $g_i$ is the function such as $g_i(C_i)=C_i$ if $a_i=0$ or $g_i(C_i)=f_i(C_i, \epsilon_i)$ if $a_i=1$, and $f_i'$ is the function such as $f_i'(C_i)=f_i(C_i,\epsilon_i)$, the expression of the variance $(\sigma_{NO\text{-}PC})_i^2$ becomes:

$(\sigma_{NO\_PC})_i^2=(1-c)(\sigma_{NO\_PC})_{i-1}^2+c((g_i \circ g_{i-1} \circ \ldots \circ g_1)^{-1}(SIR_i)-SIR_{target})^2$ and the expression of $SIR'_i$ becomes:
$SIR_i'=f_i' \circ f_{i-1}' \circ \ldots \circ f_1' \circ (g_i \circ g_{i-1} \circ \ldots \circ g_1)^{-1}(SIR_i)$ where the symbol "o" is used to indicate a composition function, and $^{-1}$ is used to indicate an inverse function.

The present invention also has for its object on entity for a mobile radiocommunication network (such as in particular BTS), as well as a mobile station (MS), for carrying out such a method.

As already noted, the present invention may be used for power control in the uplink transmission direction (from MS to BTS) as well as in the downlink transmission direction (from BTS to MS).

Figure 3:
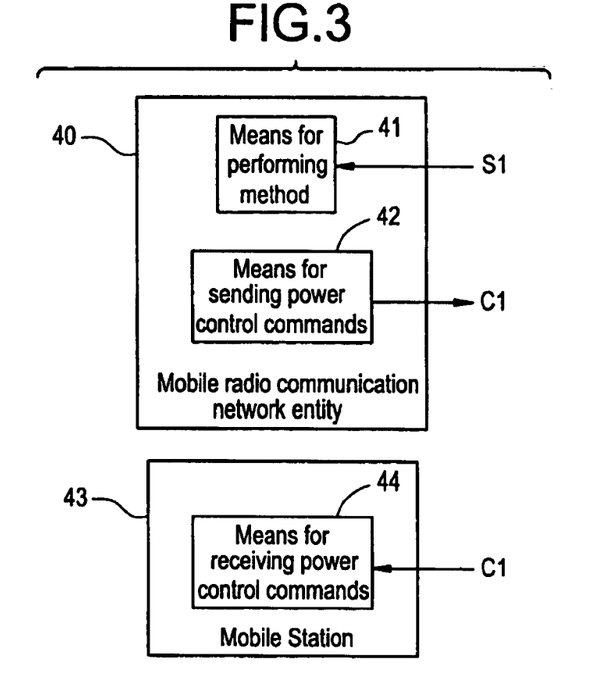
FIG. 3 is a diagram intended to illustrate the type of means required in a mobile network entity and in a mobile station to perform a method according to the present invention, in the uplink transmission direction of a mobile radiocommunication system.

In the uplink direction:
a mobile radiocommunication network entity, such as illustrated at 40 in FIG. 3, essentially comprises, further to other classical means (not mentioned here and which may be classical):
means 41 for performing such a method, from signals noted S1 received from a mobile station
means 42 for sending corresponding power control commands noted C1 to a mobile station,
a mobile station, such as illustrated at 43 on FIG. 3, essentially comprises, further to other classical means (not mentioned here and which may be classical):
means 44 for receiving power control commands C1 from a mobile radiocommunication network entity, provided according to such a method.

Figure 4:
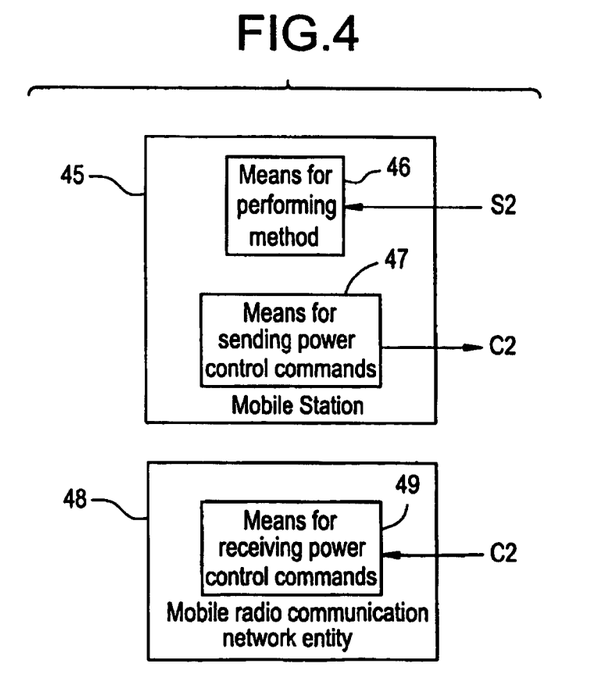
FIG. 4 is a diagram intended to illustrate the type of means required in a mobile station and in a mobile network entity to perform a method according to the present invention, in the downlink transmission direction of a mobile radiocommunication system.

In the downlink direction:
a mobile station, such as illustrated at 45 on FIG. 4, essentially comprises, further to other classical means (not mentioned here and which may be classical):
means 46 for performing such a method, from signals noted S2 received from a mobile network entity,
means 47 for sending corresponding power control commands noted C2 to a mobile network entity,
a mobile radiocommunication network entity, such as illustrated at 48 on FIG. 4, essentially comprises, further to other classical means (not mentioned here and which may be classical):
means 49 for receiving power control commands C2 from a mobile station, provided according to such a method.

Means such as 41 or 46 do not need to be more fully disclosed than as been made above by their function, for a person skilled in the art. Means such as 42, 44, 47, 49, may operate according to any known type of signalling procedures, or protocols, in such type of systems, and therefore do not either need to be more fully disclosed than has been made above, by their function.

What is claimed is:

1. A method for improving performances of a mobile radiocommunication system using a power control algorithm, said method comprising:
   regularly estimating if a criterion is met as to whether said power control algorithm should better be de-activated; and
   de-activating said power control algorithm if said criterion is met, wherein said estimating step includes:
   an estimation of performances of said system with said power control algorithm activated;
   an estimation of performance of said system with said power control algorithm de-activated; and
   making a choice between activating and de-activating said algorithm based on said estimating step.

2. A method according to claim 1, wherein said de-activation includes performing said algorithm with a relatively higher repetition period.

3. A method according to claim 1, wherein said de-activation includes performing a different algorithm instead.

4. A method according to claim 3, wherein said algorithm and said other algorithm are chosen in a group comprising closed-loop power control algorithms and open-loop power control algorithms.

5. A method according to claim 1, comprising:
   regularly estimating if a criterion is met as to whether said power control algorithm should better be de-activated, when activated, or activated, when de-activated,
   de-activating, or activating, said power control algorithm if the corresponding criterion is met.

6. A method according to claim 1, wherein provision is made not to de-activate, or activate, said algorithm too frequently.

7. A method according to claim 1, wherein said estimation as to whether said criterion is met is based on an estimation of a deviation value, representative of a deviation between an estimated transmission quality and a target transmission quality.

8. A method according to claim 7, wherein said estimation as to whether said criterion is met includes:
   an estimation of a first deviation value, which would have been obtained if said power control algorithm had always been activated, on a given time-interval on which said deviation value is estimated,
   an estimation of a second deviation value, which would have been obtained if said power control algorithm had never been activated, on said given time-interval on which said deviation value is estimated,
   a choice between activation and de-activation of said algorithm depending on which of said first and second deviation values is the lowest.

9. A method according to claim 7, wherein said estimated transmission quality is represented by an estimated signal-to-interference ratio.

10. A method according to claim 7, wherein said estimated transmission quality is represented by a received signal power.

11. A method according to claim 7, wherein said estimated deviation value is represented by the variance of said estimated transmission quality.

12. A method according to claim 1, wherein said method is performed in the uplink transmission direction of said mobile radiocommunication system.

13. A method according to claim 1, wherein said method is performed in the downlink transmission direction of said mobile radiocommunication system.

14. A method according to claim 1, wherein said mobile radiocommunication system is of CDMA type.

15. A mobile radiocommunication network entity, comprising, for performing a method according to claim 1, in the uplink transmission direction of a mobile radiocommunication system:
   means for performing said method,
   means for sending corresponding power control commands to a mobile station.

16. A mobile station, comprising, for performing a method according claim 1, in the uplink transmission direction of a mobile radiocommunication system:
   means for receiving power control commands from a mobile radiocommunication network entity, provided according to said method.

17. A mobile station, comprising, for performing a method according to claim 1, in the downlink transmission direction of a mobile radiocommunication system:
   means for performing said method,
   means for sending corresponding power control commands to a mobile radiocommunication network entity.

18. A mobile radiocommunication network entity, comprising, for performing a method according to claim 1, in the downlink transmission direction of a mobile radiocommunication system:
   means for receiving power control commands from a mobile station, provided according to said method.

19. A method for improving performances of a mobile radiocommunication system using a power control algorithm, said method comprising:
   regularly estimating if a criterion is met as to whether said power control algorithm should better be de-activated; and
   de-activating said power control algorithm if said criterion is met, wherein said estimating step includes:
   an estimation of performance of said system with said power control algorithm de-activated; and
   making a choice between activating and de-activating said algorithm based on said estimating step.

20. A method for improving performances of a mobile radiocommunication system using a power control algorithm, said method comprising:
   regularly estimating if a criterion is met as to whether said power control algorithm should better be de-activated,
   de-activating said power control algorithm if said criterion is met,
   wherein said estimation as to whether said criterion is met is based on an estimation of a deviation value, representative of a deviation between an estimated transmission quality and a target transmission quality, and
   wherein said estimation as to whether said criterion is met includes:
      an estimation of a first deviation value, which would have been obtained if said power control algorithm had always been activated, on a given time-interval on which said deviation value is estimated,
      an estimation of a second deviation value, which would have been obtained if said power control algorithm had never been activated, on said given time-interval on which said deviation value is estimated,
      a choice between activation and de-activation of said algorithm depending on which of said first and second deviation values is the lowest.

21. A method for improving performances of a mobile radiocommunication system using a power control algorithm, said method comprising:
   regularly estimating if a criterion is met as to whether said power control algorithm should better be de-activated,
   de-activating said power control algorithm if said criterion is met,
   wherein said estimation as to whether said criterion is met is based on an estimation of a deviation value, representative of a deviation between an estimated transmission quality and a target transmission quality, and
   wherein said estimated deviation value is represented by the variance of said estimated transmission quality.

22. A method for improving performances of a mobile radiocommunication system using a power control algorithm, said method comprising:
   regularly estimating if a criterion is met as to whether said power control algorithm should better be de-activated; and
   de-activating said power control algorithm if said criterion is met,
   wherein said de-activation includes performing a different type of algorithm than said power control algorithm, and
   wherein said different type of algorithm includes an algorithm showing better performances than said algorithm in fast changing environments and/or high mobile speed.

23. A method according to claim 22, comprising:
   regularly estimating if a criterion is met as to whether said power control algorithm should better be de-activated, when activated, or activated, when de-activated,
   de-activating, or activating, said power control algorithm if the corresponding criterion is met.

24. A method according to claim 22, wherein provision is made not to de-activate, or activate, said algorithm too frequently.

25. A method according to claim 22, wherein said estimation as to whether said criterion is met is based on an estimation of a deviation value, representative of a deviation between an estimated transmission quality and a target transmission quality.

26. A method for improving performances of a mobile radiocommunication system using a power control algorithm, said method comprising:
   regularly estimating if a criterion is met as to whether said power control algorithm should better be de-activated; and
   de-activating said power control algorithm if said criterion is met, wherein said de-activation includes performing a different type of algorithm than said power control algorithm,
   wherein said algorithm and said other algorithm are chosen in a group comprising closed-loop power control algorithms and open-loop power control algorithms, and
   wherein said estimation as to whether said criterion is met is based on an estimation of a deviation value, representative of a deviation between an estimated transmission quality and a target transmission quality, and
   wherein said estimation as to whether said criterion is met includes:
      an estimation of a first deviation value, which would have been obtained if said power control algorithm had always been activated, on a given time-interval on which said deviation value is estimated,
      an estimation of a second deviation value, which would have been obtained if said power control algorithm had never been activated, on said given time-interval on which said deviation value is estimated, a choice between activation and de-activation of said algorithm depending on which of said first and second deviation values is the lowest.

27. A method according to claim 25, wherein said estimated transmission quality is represented by an estimated signal-to-interference ratio.

28. A method according to claim 25, wherein said estimated transmission quality is represented by a received signal power.

29. A method for improving performances of a mobile radiocommunication system using a power control algorithm, said method comprising:

regularly estimating if a criterion is met as to whether said power control algorithm should better be de-activated; and de-activating said power control algorithm if said criterion is met, wherein said de-activation includes performing a different type of algorithm than said power control algorithm, wherein said algorithm and said other algorithm are chosen in a group comprising closed-loop power control algorithms and open-loop power control algorithms, and wherein said estimation as to whether said criterion is met is based on an estimation of a deviation value, representative of a deviation between an estimated transmission quality and a target transmission quality, and wherein said estimated deviation value is represented by the variance of said estimated transmission quality.

30. A method according to claim 22, wherein said method is performed in the uplink transmission direction of said mobile radiocommunication system.

31. A method according to claim 22, wherein said method is performed in the downlink transmission direction of said mobile radiocommunication system.

32. A method according to claim 22, wherein said mobile radiocommunication system is of CDMA type.

33. A mobile radiocommunication network entity, comprising, for performing a method according to claim 22, in the uplink transmission direction of a mobile radiocommunication system:

means for performing said method, means for sending corresponding power control commands to a mobile station.

34. A mobile station, comprising, for performing a method according claim 22, in the uplink transmission direction of a mobile radiocommunication system:

means for receiving power control commands from a mobile radiocommunication network entity, provided according to said method.

35. A mobile station, comprising, for performing a method according to claim 22, in the downlink transmission direction of a mobile radiocommunication system:

means for performing said method, means for sending corresponding power control commands to a mobile radiocommunication network entity.

36. A mobile radiocommunication network entity, comprising, for performing a method according to claim 22, in the downlink transmission direction of a mobile radiocommunication system:

means for receiving power control commands from a mobile station, provided according to said method.

37. A method according to claim 22, wherein said power control algorithm is one of a closed loop and open loop algorithm, and said different type of algorithm is the other of said closed loop or open loop algorithm.

38. A method for improving performances of a mobile radiocommunication system using a power control algorithm, said method comprising:

regularly estimating whether a criterion is met as to whether said power control algorithm should better not be performed, and not performing any power control algorithm in accordance with a result of said estimating step, wherein said estimation as to whether said criterion is met is based on an estimation of a deviation value, representative of a deviation between an estimated transmission quality and a target transmission quality.

39. A method according to claim 38, wherein said estimation as to whether said criterion is met includes:

an estimation of a first deviation value, which would have been obtained if said power control algorithm had always been activated, on a given time-interval on which said deviation value is estimated, an estimation of a second deviation value, which would have been obtained if said power control algorithm had never been activated, on said given time-interval on which said deviation value is estimated, a choice between activation and de-activation of said algorithm depending on which of said first and second deviation values is the lowest.

40. A method according to claim 38, wherein said estimated transmission quality is represented by an estimated signal-to-interference ratio.

41. A method according to claim 38, wherein said estimated transmission quality is represented by a received signal power.

42. A method according to claim 38, wherein said estimated deviation value is represented by the variance of said estimated transmission quality.

43. A method for improving performances of a mobile radiocommunication system using a power control algorithm, said method comprising:

regularly estimating if a criterion is met as to whether said power control algorithm should better be de-activated; and de-activating said power control algorithm if said criterion is met, wherein said de-activation includes performing a different type of algorithm than said power control algorithm, wherein said algorithm is one of a closed loop power control algorithm and a open loop power control algorithm and said other algorithm is the other of said closed loop power control algorithm and said open loop power control algorithm.

44. A mobile radiocommunication network entity, comprising, for performing a method according to claim 19, in the uplink transmission direction of a mobile radiocommunication system:

means for performing said method, means for sending corresponding power control commands to a mobile station.

45. A mobile station, comprising, for performing a method according claim 19, in the uplink transmission direction of a mobile radiocommunication system:

means for receiving power control commands from a mobile radiocommunication network entity, provided according to said method.

46. A mobile station, comprising, for performing a method according to claim 19, in the downlink transmission direction of a mobile radiocommunication system:

means for performing said method, means for sending corresponding power control commands to a mobile radiocommunication network entity.

47. A mobile radiocommunication network entity, comprising, for performing a method according to claim 19, in the downlink transmission direction of a mobile radiocommunication system:

means for receiving power control commands from a mobile station, provided according to said method.

48. A mobile radiocommunication network entity, comprising, for performing a method according to claim 20, in the uplink transmission direction of a mobile radiocommunication system:

means for performing said method, means for sending corresponding power control commands to a mobile station.

49. A mobile station, comprising, for performing a method according claim 20, in the uplink transmission direction of a mobile radiocommunication system:

means for receiving power control commands from a mobile radiocommunication network entity, provided according to said method.

50. A mobile station, comprising, for performing a method according to claim 20, in the downlink transmission direction of a mobile radiocommunication system:

means for performing said method, means for sending corresponding power control commands to a mobile radiocommunication network entity.

51. A mobile radiocommunication network entity, comprising, for performing a method according to claim 20, in the downlink transmission direction of a mobile radiocommunication system:

means for receiving power control commands from a mobile station, provided according to said method.

52. A mobile radiocommunication network entity, comprising, for performing a method according to claim 21, in the uplink transmission direction of a mobile radiocommunication system:

means for performing said method, means for sending corresponding power control commands to a mobile station.

53. A mobile station, comprising, for performing a method according claim 21, in the uplink transmission direction of a mobile radiocommunication system:

means for receiving power control commands from a mobile radiocommunication network entity, provided according to said method.

54. A mobile station, comprising, for performing a method according to claim 21, in the downlink transmission direction of a mobile radiocommunication system:

means for performing said method, means for sending corresponding power control commands to a mobile radiocommunication network entity.

55. A mobile radiocommunication network entity, comprising, for performing a method according to claim 21, in the downlink transmission direction of a mobile radiocommunication system:

means for receiving power control commands from a mobile station, provided according to said method.

56. A mobile radiocommunication network entity, comprising, for performing a method according to claim 26, in the uplink transmission direction of a mobile radiocommunication system:

means for performing said method, means for sending corresponding power control commands to a mobile station.

57. A mobile station, comprising, for performing a method according claim 26, in the uplink transmission direction of a mobile radiocommunication system:

means for receiving power control commands from a mobile radiocommunication network entity, provided according to said method.

58. A mobile station, comprising, for performing a method according to claim 26, in the downlink transmission direction of a mobile radiocommunication system:

means for performing said method, means for sending corresponding power control commands to a mobile radiocommunication network entity.

59. A mobile radiocommunication network entity, comprising, for performing a method according to claim 26, in the downlink transmission direction of a mobile radiocommunication system:

means for receiving power control commands from a mobile station, provided according to said method.

60. A mobile radiocommunication network entity, comprising, for performing a method according to claim 29, in the uplink transmission direction of a mobile radiocommunication system:

means for performing said method, means for sending corresponding power control commands to a mobile station.

61. A mobile station, comprising, for performing a method according claim 29, in the uplink transmission direction of a mobile radiocommunication system:

means for receiving power control commands from a mobile radiocommunication network entity, provided according to said method.

62. A mobile station, comprising, for performing a method according to claim 29, in the downlink transmission direction of a mobile radiocommunication system:

means for performing said method, means for sending corresponding power control commands to a mobile radiocommunication network entity.

63. A mobile radiocommunication network entity, comprising, for performing a method according to claim 29, in the downlink transmission direction of a mobile radiocommunication system:

means for receiving power control commands from a mobile station, provided according to said method.

64. A mobile radiocommunication network entity, comprising, for performing a method according to claim 38, in the uplink transmission direction of a mobile radiocommunication system:

means for performing said method, means for sending corresponding power control commands to a mobile station.

65. A mobile station, comprising, for performing a method according claim 38, in the uplink transmission direction of a mobile radiocommunication system:

means for receiving power control commands from a mobile radiocommunication network entity, provided according to said method.

66. A mobile station, comprising, for performing a method according to claim 38, in the downlink transmission direction of a mobile radiocommunication system:

means for performing said method, means for sending corresponding power control commands to a mobile radiocommunication network entity.

67. A mobile radiocommunication network entity, comprising, for performing a method according to claim 38, in the downlink transmission direction of a mobile radiocommunication system:

means for receiving power control commands from a mobile station, provided according to said method.

68. A mobile radiocommunication network entity, comprising, for performing a method according to claim 43, in the uplink transmission direction of a mobile radiocommunication system:

means for performing said method, means for sending corresponding power control commands to a mobile station.

69. A mobile station, comprising, for performing a method according claim 43, in the uplink transmission direction of a mobile radiocommunication system:

means for receiving power control commands from a mobile radiocommunication network entity, provided according to said method.

70. A mobile station, comprising, for performing a method according to claim 43, in the downlink transmission direction of a mobile radiocommunication system:

means for performing said method, means for sending corresponding power control commands to a mobile radiocommunication network entity.

71. A mobile radiocommunication network entity, comprising, for performing a method according to claim 43, in the downlink transmission direction of a mobile radiocommunication system:

means for receiving power control commands from a mobile station, provided according to said method.

* * * * *